Patented Nov. 11, 1952

2,617,722

UNITED STATES PATENT OFFICE 2,617,722

METHOD OF DESTROYING UNDESIRED PLANTS

David T. Mowry and Arthur H. Schlesinger, Dayton, Ohio, assignors to Monsanto Chemical Company, St. Louis, Mo., a corporation of Delaware No Drawing. Application December 6, 1950, Serial No. 199,581

7 Claims. (Cl. 71—2.7)

The present invention relates to herbicides and deals more particularly with methods for the general destruction of undesired plants.

A number of herbicides are known, a variety of organic and inorganic compounds having been suggested in the prior art for use as plant-killers. Among the disadvantages of known herbicides may be mentioned corrosive effect on equipment, chemical reactivity with other components customarily employed in agricultural sprays or powders, instability when exposed for long periods of time to ordinary atmospheric conditions, and soil instability, e. g., chemical reactivity with soil components and susceptibility to decomposition by soil micro-organisms, which results in loss of the active material. Thus, a herbicide possessing a free carboxy group may be substantially deactivated in alkaline soil by reaction with basic, salt-forming materials in such soils. Conversely, a herbicide having reactive basic substituents may be deactivated by reaction with the acid constituents of acidic soils.

Now we have found that highly stable, non-corrosive herbicidal compositions are obtained by employing as the active ingredient an ester having the general formula $CCl_3CH:C(COOR)_2$ in which R is an alkyl radical of from 1 to 4 carbon atoms. As examples of compounds having the above general formula may be mentioned dimethyl, dipropyl, diisopropyl, dibutyl and diisobutyl 2,2,2-trichloroethylidenemalonate. These dialkyl 2,2,2-trichloroethylidenemalonates are readily obtainable by reaction of chloral with the appropriate dialkyl malonate.

Compounds having the above general formula are effective herbicides over wide ranges of concentrations. The effectiveness may be measured by determining the inhibition of root growth as compared to similar untreated plants. The general usefulness of a herbicide may be measured by comparing the concentrations of a herbicide required to produce a certain inhibition on a broad-leafed plant with the concentration of a herbicide required to produce the same inhibition on a narrow-leafed plant. For evaluation in many laboratories the cucumber has been adapted as a typical broad-leafed dicotyledonous plant for technical reasons, and wheat has been used as a standard narrow-leafed monocotyledonous plant. The general technique of evaluation of herbicides by growing seedlings in petri dishes has been described by Thompson, Swanson, and Norman, Botanical Gazette, 107, 476–507 (1946).

The present invention is illustrated, but not limited, by the following examples:

Example 1

Herbicidal activity of diethyl 2,2,2-trichloroethylidenemalonate was determined by germination of cucumber seeds for 4 days at a temperature of 76° F. in the presence of aqueous suspensions of each of the indicated chemicals at concentration of 100 p. p. m. Seventy five seeds were used for each test. The results are expressed as per cent length of the primary roots in the presence of the chemical compared with the length of the primary roots of controls which had been germinated in water. The activity of a number of standard herbicides as obtained by the same test are included for comparison.

| Compound Tested | Percent Growth at 100 Parts per Million |
| --- | --- |
| Diethyl 2,2,2-trichloroethylidenemalonate | 4 |
| 2,4-dichlorophenoxyacetic acid | 6 |
| Isopropyl Carbanilate | 14 |

Similarly good results may be obtained with other dialkyl 2,2,2-trichloroethylidenemalonates, e. g., dimethyl 2,2,2-trichloroethylidenemalonate, di-n-propyl 2,2,2-trichloroethylidenemalonates or diisobutyl 2,2,2-trichloroethylidenemalonates.

The herbicidal efficiency of the present esters is remarkable, because as shown in the table given below related compounds do not generally possess great herbicidal efficiency. When tested as described above, aqueous suspensions of a random group of such compounds were found to have the following effects:

| Compound Tested | Percent Growth at 100 Parts per Million |
| --- | --- |
| Ethyl 2,2,2-trichloroethylidene cyanoacetate | 85 |
| Methallyl trichloroacetate | 99 |
| Monomethyl itaconate | 80 |
| Dimethyl maleate | 55 |
| Diamyl Fumarate | 84 |

Example 2

Diethyl 2,2,2-trichloroethylidenemalonate was tested with both cucumber and wheat seeds and the percentage of growth inhibition measured at various concentrations. The concentration of each compound which permitted 20 per cent of normal growth (80 per cent inhibition) was determined for seeds of cucumber and wheat, respectively. The following results, expressed as parts per million of the herbicide, were obtained.

|  | Cucumber | Wheat | Ratio |
|---|---|---|---|
| Diethyl 2,2,2-trichloroethylidene-malonate | 20 | 22 | 1.1 |

The low narrow leaf: broad leaf ratio obtained for the present ester indicates general utility against both types of plants.

*Example 3*

The herbicidal action of diethyl 2,2,2-trichloroethylidenemalonate was further demonstrated as follows:

Emulsions of the ester were prepared, using cyclohexanone as solvent and as an emulsifier a mixture consisting of 65% of a surface-active agent known to the trade as "Sterox CD" and 35% of a surface-active agent known to the trade as "Santomerse 43."

The malonate was used at two different concentrations. Emulsion I contained one part of the ester per 100 parts of solvent and Emulsion II contained one part of the ester per 315 parts of the solvent.

Potted plants of string bean and corn were treated with each of the above emulsions, the beans being treated when the second leaves were well developed and the corn when 9 to 12 inches high. Treatment was effected by dipping the plants in the emulsions, draining off excess emulsion, and maintaining the pots in a greenhouse for a period of two weeks. Observation of the treated plants at the end of that time showed killing of the bean-foliage and complete killing of the corn with Emulsion I. At the lower (1:315) concentration, there was only moderate damage to the bean plants, whereas the corn was completely dead.

The present esters are preferably applied by spraying an aqueous solution of the same, this method affording an easy and inexpensive way of destroying plant growth. However, they are likewise effective when applied in agricultural dusts; or they may be used with water-insoluble insecticides, fungicides, etc. in customarily employed organic solutions.

The aqueous solutions may be used to destroy already existing plant growth by direct application to the undesirable plants, or they may be employed to prevent the plant growth by application to soils. When employed to prevent plant growth, for example in parking areas, highway abutments, railway yards, etc., they may be applied either as an aqueous spray or dust or they may be admixed with customarily employed temporary surfacing materials, e. g., oils, cinders, etc. The present invention thus provides a generally useful method of preventing and destroying undesirable plant growth.

0.1 part to 20 parts of the dialkyl 2,2,2-trichloroethylidenemalonate per hundred parts by weight of the carrier may be employed, and in this manner an acre of land may be free of plants by application of only a few pounds of one of the present herbicides.

What we claim is:

1. A method of destroying undesired plants which comprises applying to said plants a toxic quantity of a herbicidal composition comprising, as the active ingredient, an ester having the general formula $CCl_3C:C(COOR)_2$, in which R is an alkyl radical of from 1 to 4 carbon atoms.

2. A method of destroying undesired plants which comprises applying to said plants a toxic quantity of a herbicidal composition including diethyl 2,2,2-trichloroethylidenemalonate as the active ingredient.

3. A method of destroying undesired plants which comprises applying to said plants a toxic quantity of a herbicidal composition including dimethyl 2,2,2-trichloroethylidenemalonate as the active ingredient.

4. A method of destroying undesired plants which comprises applying to said plants a toxic quantity of a herbicidal composition including di-n-propyl 2,2,2-trichloroethylidenemalonate as the active ingredient.

5. A method of destroying undesired plants which comprises applying to said plants a toxic quantity of a herbicidal composition including diisobutyl 2,2,2-trichloroethylidenemalonate as the active ingredient.

6. A method of destroying undesired plants which comprises applying to said plants a toxic quantity of a herbicidal composition including a carrier and diethyl 2,2,2-trichloroethylidenemalonate as the active ingredient.

7. A method of destroying undesired plants which comprises applying to said plants a toxic quantity of an aqueous suspension of diethyl 2,2,2-trichloroethylidenemalonate.

DAVID T. MOWRY.
ARTHUR H. SCHLESINGER.

REFERENCES CITED

The following references are of record in the file of this patent:

Beilstein, "Handbuch der Organischen Chemie" (4th Edition, 1920), vol. 2, p. 773.